(12) United States Patent
Dalsgaard et al.

(10) Patent No.: US 11,788,511 B2
(45) Date of Patent: Oct. 17, 2023

(54) METHOD AND APPARATUS FOR TESTING A YAW SYSTEM

(71) Applicant: Vestas Wind Systems A/S, Aarhus N. (DK)

(72) Inventors: Søren Dalsgaard, Hadsten (DK); Peter Bøttcher, Egå (DK); Jesper Lykkegaard Neubauer, Hornslet (DK); Anders Yde Wollesen, Aarhus C. (DK); Julio Xavier Vianna Netø, Århus N (DK); Torben Ladegaard Baun, Skødstrup (DK)

(73) Assignee: Vestas Wind Systems A/S, Aarhus N (DK)

( * ) Notice: Subject to any disclaimer, the term of this patent is extended or adjusted under 35 U.S.C. 154(b) by 207 days.

(21) Appl. No.: 17/299,085

(22) PCT Filed: Dec. 17, 2019

(86) PCT No.: PCT/DK2019/050399
§ 371 (c)(1),
(2) Date: Jun. 2, 2021

(87) PCT Pub. No.: WO2020/125896
PCT Pub. Date: Jun. 25, 2020

(65) Prior Publication Data
US 2022/0065227 A1    Mar. 3, 2022

(30) Foreign Application Priority Data

Dec. 20, 2018   (DK) .......................... PA 2018 70839

(51) Int. Cl.
*F03D 1/02*        (2006.01)
*F03D 7/02*        (2006.01)
(Continued)

(52) U.S. Cl.
CPC ............... *F03D 17/00* (2016.05); *F03D 1/02* (2013.01); *F03D 7/0204* (2013.01); *F03D 7/046* (2013.01);
(Continued)

(58) Field of Classification Search
CPC ........ F03D 13/30; F03D 17/00; F03D 7/0204; F05B 2260/83
See application file for complete search history.

(56) References Cited

U.S. PATENT DOCUMENTS 9,359,995 B2 *   6/2016   Trede ........................ F03D 1/06
9,869,298 B2 *   1/2018   Rosenvard ............ F03D 7/0224
(Continued)

FOREIGN PATENT DOCUMENTS

CN    202274984 U    6/2012
CN    102562456 A    7/2012
(Continued)

OTHER PUBLICATIONS

Danish Patent and Trademark Office, Search and Examination Report in PA 2018 70839, dated Jun. 7, 2019.
(Continued)

*Primary Examiner* — Justin D Seabe
(74) *Attorney, Agent, or Firm* — Wood Herron & Evans LLP (57) ABSTRACT

A first aspect of the invention provides a method of testing a yaw system (200) of a wind turbine, the wind turbine comprising a rotor; the yaw system (200) comprising a yaw gear (202) coupled to the rotor so that rotation of the yaw gear (202) causes yaw rotation of the rotor, and first and second sub-systems (204a, 204b), the first sub-system (204a) comprising a first pinion gear (206a) and a first drive motor (208a) coupled to the yaw gear (202) by the first pinion gear (206a), the second sub-system (204b) compris-
(Continued)

ing a second pinion gear (206b) and a second drive motor (208b) coupled to the yaw gear (202) by the second pinion gear (206b). The method comprises the steps of: testing the first sub-system (204a) by: applying a first yaw moment to the yaw gear (202) with the second drive motor (208b) via the second pinion gear (206b), reacting the first yaw moment with the first pinion gear (206a), monitoring a yaw motion parameter indicative of rotation of the yaw gear (202), and determining a condition of the first sub-system (204a) based on the monitored yaw motion parameter.

18 Claims, 5 Drawing Sheets

(51) Int. Cl.
  *F03D 7/00* (2006.01)
  *F03D 17/00* (2016.01)
  *F03D 7/04* (2006.01)
(52) U.S. Cl.
  CPC ....... *F05B 2260/80* (2013.01); *F05B 2260/83* (2013.01); *F05B 2270/329* (2013.01)

(56) References Cited

U.S. PATENT DOCUMENTS

| | | | | |
|---|---|---|---|---|
| 10,100,810 | B2* | 10/2018 | Frederiksen | .......... F03D 7/0244 |
| 2002/0109402 | A1 | 8/2002 | Nakamura | |
| 2011/0268568 | A1* | 11/2011 | Scholte-Wassink | ........................ F03D 7/0204 290/44 |
| 2013/0115043 | A1 | 5/2013 | Rosenvard et al. | |
| 2013/0170989 | A1 | 7/2013 | Trede et al. | |
| 2014/0041474 | A1* | 2/2014 | Close | ................... F03D 7/0204 74/405 |

FOREIGN PATENT DOCUMENTS

| | | |
|---|---|---|
| CN | 103047082 A | 4/2013 |
| CN | 103383306 A | 11/2013 |
| CN | 103742361 A | 4/2014 |
| CN | 203702457 U | 7/2014 |
| CN | 105569918 A | 5/2016 |
| DE | 102008011148 A1 | 10/2009 |
| JP | S57135940 U | 8/1982 |
| WO | 2008053017 A2 | 5/2008 |
| WO | 2018157897 A1 | 9/2018 |

OTHER PUBLICATIONS

European Patent Office, International Search Report and Written Opinion in PCT Application No. PCT/DK2019/050399, dated Mar. 6, 2020.

China National Intellectual Property Administration, office action issued in corresponding Chinese Application No. 201980084323.4, dated Apr. 28, 2023, with English translation.

* cited by examiner

METHOD AND APPARATUS FOR TESTING A YAW SYSTEM

FIELD OF THE INVENTION

The present invention relates to the field of yaw systems of wind turbines, specifically testing such yaw systems. The wind turbine may be a multi-rotor wind turbine or a single-rotor wind turbine.

BACKGROUND OF THE INVENTION

A known yaw system monitor for a multi-rotor wind turbine system is described in WO-A1-2018/157897. The multi-rotor wind turbine comprises a tower with a support structure, at least two wind turbine modules mounted to the support structure and a yaw system arranged to enable rotation of the support structure around the tower. The method comprises applying a yaw moment on the yaw system in order to rotate the support structure, increasing the applied yaw moment towards a yaw moment threshold, monitoring a yaw parameter indicative of yaw movement, and determining a condition of the yaw system based on the monitored yaw parameter.

The applied yaw moment may be generated by controlling the thrust force of at least one of the wind turbine modules, or by controlling a yaw drive of the yaw system to rotate the support structure.

SUMMARY OF THE INVENTION

A first aspect of the invention provides a method of testing a yaw system of a wind turbine, the wind turbine comprising a rotor; the yaw system comprising a yaw gear coupled to the rotor so that rotation of the yaw gear causes yaw rotation of the rotor, and first and second sub-systems, the first sub-system comprising a first pinion gear and a first drive motor coupled to the yaw gear by the first pinion gear, the second sub-system comprising a second pinion gear and a second drive motor coupled to the yaw gear by the second pinion gear. The method comprises: testing the first sub-system by: applying a first yaw moment to the yaw gear with the second drive motor via the second pinion gear, reacting the first yaw moment with the first pinion gear, monitoring a yaw motion parameter indicative of rotation of the yaw gear, and determining a condition of the first sub-system based on the monitored yaw motion parameter.

Preferably the first yaw moment is reacted by applying a first yaw counter-moment to the yaw gear with the first pinion gear, wherein the first yaw counter-moment opposes the first yaw moment.

The method may further comprise: testing the second sub-system by: applying a second yaw moment to the yaw gear with the first drive motor via the first pinion gear, reacting the second yaw moment with the second pinion gear, monitoring a yaw motion parameter indicative of rotation of the yaw gear, and determining a condition of the second sub-system based on the monitored yaw motion parameter.

Preferably the second yaw moment is reacted by applying a second yaw counter-moment to the yaw gear with the second pinion gear, wherein the second yaw counter-moment opposes the second yaw moment.

During the test of the first sub-system, the first sub-system may be held by a first brake or a first hydraulic circuit. For example the first brake may hold the first motor, the first pinion gear, or any other part of a drive train between the first motor and the first pinion gear.

During the test of the second sub-system, the second sub-system may be held by a second brake or a second hydraulic circuit. For example the second brake may hold the second motor, the second pinion gear, or any other part of a drive train between the second motor and the second pinion gear.

During the test of the first sub-system the first drive motor may be energised to generate a first yaw counter-moment which reacts the first yaw moment via the first pinion gear; and/or during the test of the second sub-system the second drive motor may be energised to generate a second yaw counter-moment which reacts the second yaw moment via the second pinion gear. In this case the first drive motor and/or the second drive motor may be an electric motor.

A magnitude of the first yaw moment may increase during the testing of the first sub-system, and/or a magnitude of the second yaw moment may increase during the testing of the second sub-system.

Determining a condition of the first sub-system based on the monitored yaw motion parameter may comprise determining a yaw moment parameter indicative of a magnitude of the first yaw moment at a point when the monitored yaw motion parameter indicates that the yaw gear has rotated, for instance because the first sub-system has slipped or been back-driven.

Determining a condition of the second sub-system based on the monitored yaw motion parameter may comprise determining a yaw moment parameter indicative of a magnitude of the second yaw moment at a point when the monitored yaw motion parameter indicates the yaw gear has rotated, for instance because the second sub-system has slipped or been back-driven.

Optionally the yaw moment parameter is compared to an expected level in order to identify a fault condition of the sub-system being tested: for example a stuck fault condition associated with a high yaw moment parameter, or a loose fault condition associated with a low yaw moment parameter.

Each of the first and second sub-systems may have a plurality of motors and a plurality of pinion gears, each motor of the plurality of motors being coupled to the yaw gear via a respective pinion gear. During the test of the first sub-system yaw moments may be simultaneously applied to the yaw gear by each of the motors of the second sub-system via their respective pinion gears and reacted by each of the pinion gears of the first sub-system, and/or during the test of the second sub-system yaw moments may be simultaneously applied to the yaw gear by each of the motors of the first sub-system via their respective pinion gears and reacted by each of the pinion gears of the second sub-system.

The wind turbine may comprise at least two rotors, wherein the yaw gear is coupled to the rotors so that rotation of the yaw gear causes yaw rotation of the rotors. Alternatively the wind turbine may have only a single rotor.

The wind turbine may comprise a tower with a support structure, the rotor being mounted to the support structure, and rotation of the yaw gear causing yaw rotation of the support structure about a longitudinal axis of the tower, or a vertical axis.

A further aspect of the invention provides a method of testing and controlling a wind turbine, the method comprising: testing a yaw system of the wind turbine by performing the testing method of the first aspect; and after testing the yaw system, controlling a yaw position of the rotor by simultaneously applying yaw control moments to the yaw gear with the first and second drive motors via the first and second pinion gears respectively so that rotation of the yaw gear causes yaw rotation of the rotor. Thus during testing, the sub-systems apply opposing yaw moments to the yaw gear so they act against each other; and after testing, the sub-systems act together and apply non-opposing yaw moments to the yaw gear.

A further aspect of the invention provides a method of testing and controlling a wind turbine, the method comprising: testing a yaw system of the wind turbine by performing the testing method of the first aspect; and if a fault condition is determined by the testing method, derating the wind turbine, performing a controlled shutdown of the wind turbine or preventing the wind turbine from starting up.

A further aspect of the invention provides a test system for testing a yaw system of a wind turbine, wherein the test system is arranged to test the yaw system by performing the method of the first aspect.

A further aspect of the invention provides a wind turbine comprising: a rotor; a yaw system comprising a yaw gear coupled to the rotor so that rotation of the yaw gear causes yaw rotation of the rotor, first and second sub-systems, the first sub-system comprising a first pinion gear and a first drive motor coupled to the yaw gear by the first pinion gear, the second sub-system comprising a second pinion gear and a second drive motor coupled to the yaw gear by the second pinion gear; and a test system according to the previous aspect arranged to test the yaw system.

The yaw system may further comprise a first brake or a first hydraulic circuit arranged to hold the first sub-system; and a second brake or a second hydraulic circuit arranged to hold the second sub-system.

The wind turbine may comprise at least two rotors, wherein the yaw gear is coupled to the rotors so that rotation of the yaw gear causes yaw rotation of the rotors.

A further aspect of the invention provides a computer program product directly loadable into a memory accessible by a controller, the computer program product comprising instructions for performing the steps of the first aspect when the computer program product is run on the controller.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
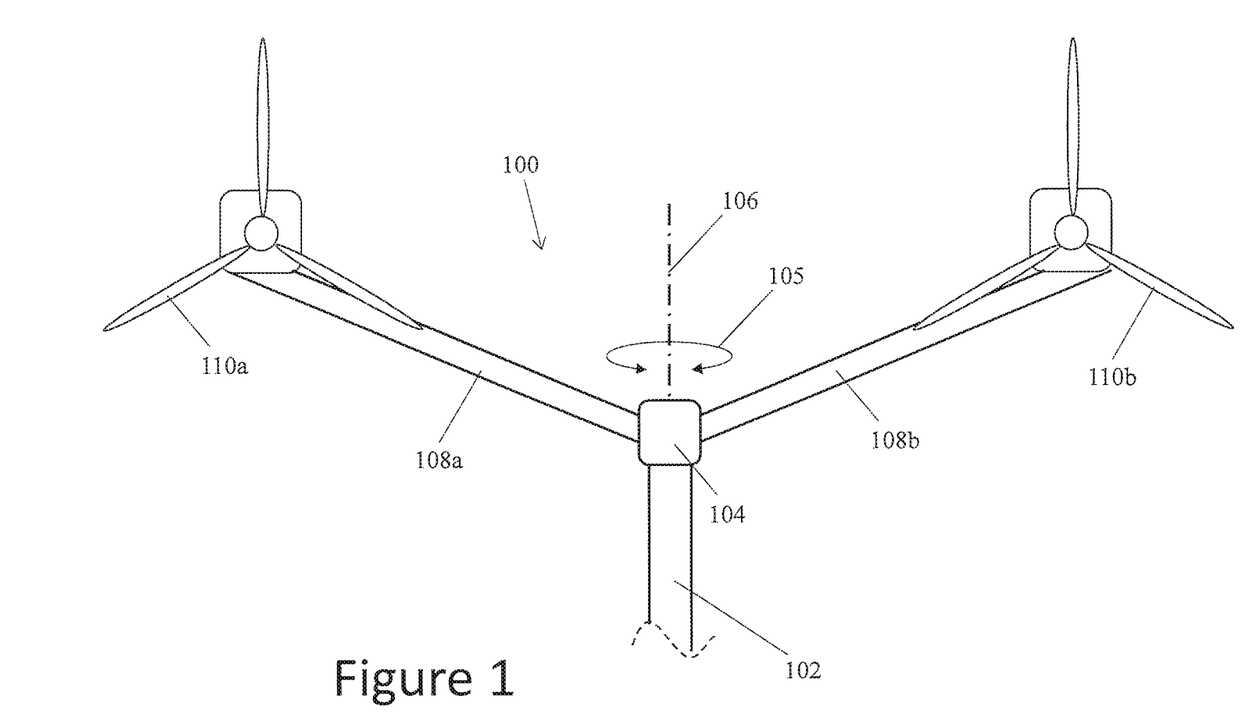
FIG. 1 shows a portion of a wind turbine in accordance with an embodiment of the present invention.

FIG. 1 shows a wind turbine 100. The wind turbine 100 comprises a tower 102, only the top portion of which is shown. The base of the tower 102 may be mounted to the ground; or the wind turbine could be an offshore turbine, in which case the foundation could be fixed to the mudline, or floating.

The wind turbine 100 further comprises a yaw bearing 104 carrying two support arms 108a, 108b. The yaw bearing 104 enables yaw rotation 105 of the support arms 108a, 108b about a vertical pivot axis 106 aligned with a longitudinal axis of the tower 102 in a clockwise or counter-clockwise direction.

Each of the support arms 108a, 108b carries a respective rotor 110a, 110b. The rotors 110a, 110b are configured to rotate to generate electrical power from the wind. Although two rotors 110a, 110b are illustrated in FIG. 1, it will be appreciated that only one rotor may be carried by the tower 102, or more than two rotors may be present—for instance there may be two pairs of rotors as shown in WO-A1-2018/157897, each pair of rotors carried by a respective pair of support arms. In this embodiment each pair of rotors and its respective pair of support arms may be controlled by a respective yaw system, so each yaw system is independent from the other(s), i.e. they can yaw to different angles.

Figure 2:
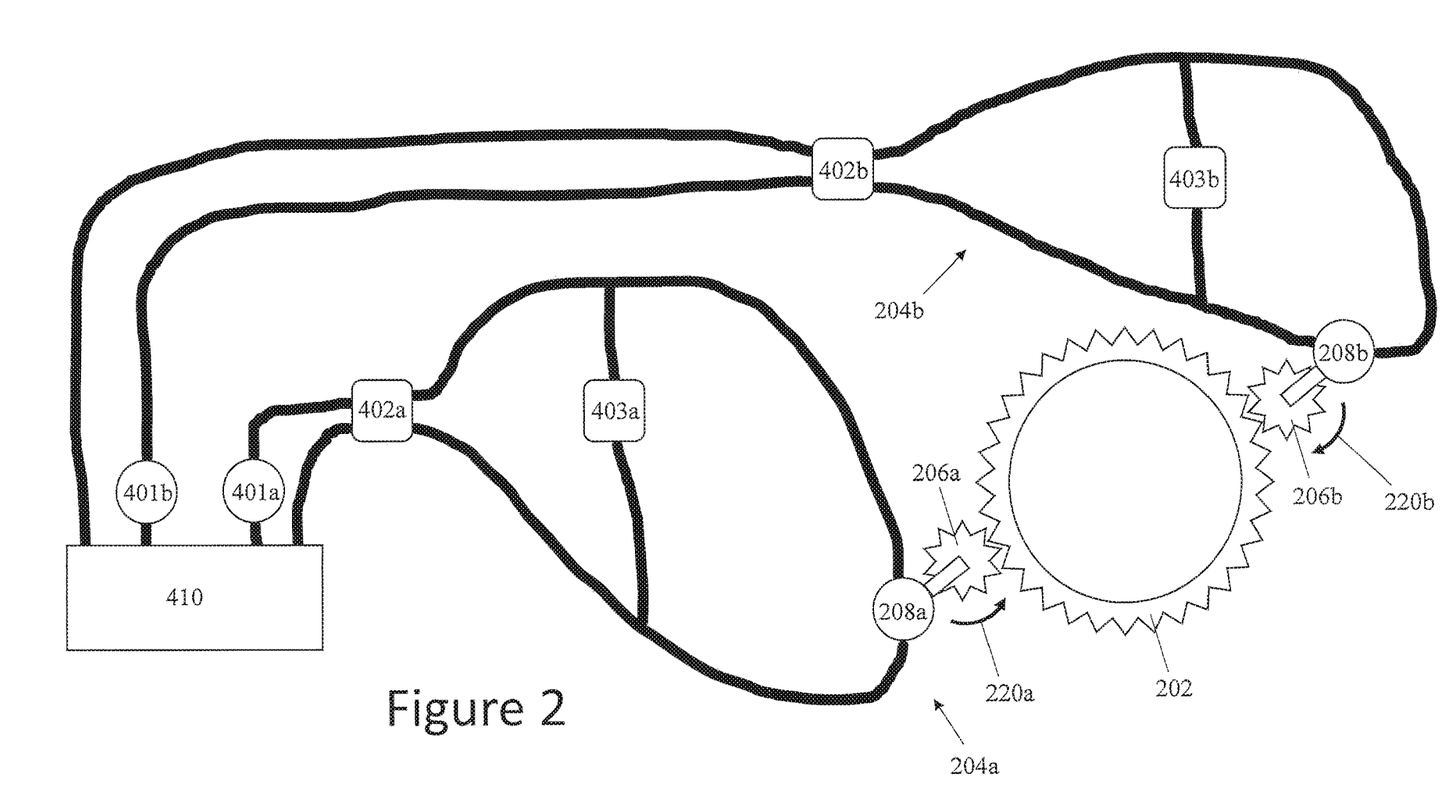
FIG. 2 shows a schematic view of a yaw system in accordance with a first embodiment of the present invention.

Turning now to FIG. 2, a yaw system is shown which controls the yaw rotation of the support arms 108a, 108b. The yaw system comprises a yaw gear 202 coupled to the rotors 110a, 110b via the support arms 108a, 108b so that rotation of the yaw gear 202 causes the yaw rotation 105 of the support arms 108a, 108b and their associated rotors 110a, 110b.

The yaw system comprises independent and de-coupled first and second sub-systems 204a, 204b which both act on the yaw gear 202. The first sub-system 204a comprises a first pinion gear 206a, and a first drive motor 208a coupled to the yaw gear 202 by the first pinion gear 206a. The second sub-system 204b comprises a second pinion gear 206b, and a second drive motor 208b coupled to the yaw gear 202 by the second pinion gear 206b. The first and second pinion gears 206a, 206b mesh with the yaw gear 202 such that rotation of the yaw gear 202 causes rotation of the first and second pinion gears 206a, 206b, and vice versa.

In the case FIG. 2 no gearboxes are shown, but in an alternative embodiment there may be a gearbox between each drive motor and its respective pinion.

Each motor 208a, 208b is controlled by a respective hydraulic circuit. Each hydraulic circuit comprises a pump 401a, 401b coupled to an oil tank 410. In this case the hydraulic circuits share a single oil tank 410, but alternatively each hydraulic system may have its own, dedicated oil tank. In this case the hydraulic circuits have dedicated pumps, but alternatively the hydraulic systems may share a single pump.

Each pump pressurizes its respective hydraulic circuit via a respective direction valve 402a, 402b. Each direction valve 402a, 402b has three settings: a first drive setting in which it connects the high pressure line from the pump to a first side of the motor; a second drive setting in which it connects the high pressure line from the pump to a second side of the motor; and a closed setting in which the flow of oil is blocked to and from the motor. The drive settings enable each motor to be actively driven in either direction. The closed setting provides a hold function which restrains the motor.

Each hydraulic circuit also has a respective relief valve 403a, 403b which is ordinarily closed. If the pressure being applied across the drive motor 208a, 208b is too high (if the pressure exceeds a threshold, for example) then the relief valve 403a, 403b opens, reducing the pressure across the drive motor and protecting the system from overload.

Thus the direction valves 402a, 402b provide the yaw system with a hold function (via their closed settings) to prevent yaw rotation for yaw moments below the threshold of the relief valves, and the relief valves 403a, 403b provide the yaw system with a yaw slippage function for yaw moments above the threshold of the relief valves.

The threshold of the relief valves is built into the design of the wind turbine 100 and/or acquired through calibration or measurement. During the test procedures described below, the threshold of the relief valves may be set to a normal level, or to a reduced level which is less than the normal level.

The yaw system of FIG. 2 is tested using the following test procedure. The two sub-systems are tested individually. The testing of each sub-system is similar, so only the test procedure for the first sub-system will be described in detail.

To test the first sub-system 204a, the direction valve 402a is closed and the direction valve 402b is opened with the pump 401b energised so that the second drive motor 208b applies a first yaw moment 220b to the yaw gear 202 via the second pinion gear 206b. This first yaw moment 220b is transmitted to the first sub-system via the yaw gear 202. Since the direction valve 402a is closed, the first yaw moment 220b is reacted by the first pinion gear 206a—in other words the first pinion gear 206a applies an equal and opposite yaw counter-moment 220a so the forces are in equilibrium and there is no yaw rotation.

The second drive motor 208b is ramped up in power so that the magnitude of the first yaw moment 220b increases until the pressure difference across the relief valve 403a of the first sub-system is opened by the increased pressure, at which point oil flows across the open relief valve 403a, and the motors 208a, 208b, yaw gear 202 and pinion gears 206a, 206b rotate. Such rotation is referred to as "sliding" or "slippage".

The power may be ramped up by gradually increasing the pressure at the pump 401b, consequently increasing the pressure in the hydraulic circuit.

A yaw motion parameter indicative of such sliding or slippage rotation of the yaw gear 202 is monitored, and a condition of the first sub-system 204a based on the monitored yaw motion parameter is then determined. For instance the condition may be determined on the basis of a yaw moment parameter indicative of the magnitude of the first yaw moment being applied at the point in time when the monitored yaw motion parameter indicates that the yaw gear is rotating.

An example of the yaw moment parameter is the pressure difference across the second drive motor 208b. Other methods of measuring the yaw moment parameter are to measure the pressure difference across the pump with a pressure sensor, to measure the power from the pump, or to measure the torque on a shaft of the pinion gear with a torque sensor.

Examples of the monitored yaw motion parameter includes obtaining the yaw orientation from a yaw position sensor, or obtaining operational values from the yaw system. The yaw position sensor may be an encoder or resolver coupled to one of the drive motors. The operational values may be values relating to the fluid flow in one of the hydraulic circuits, or current in an electric yaw system (described below). That is, if the yaw gear 202 is rotated, the hydraulic or electric yaw drive may generate a measurable fluid flow in the hydraulic circuit or an electric current from an electric motor, respectively. Accordingly, the monitored yaw motion parameter can be used for determining if the yaw gear 202, or any other rotatable part of the wind turbine (for example the support arms 108a, 108b) has been rotated by the applied yaw moment 220b.

When the monitored yaw motion parameter indicates sliding or slippage rotation of the yaw gear 202, the magnitude of the first yaw moment 220b at the point of slippage is compared to an expected sliding level. If this comparison yields a significant difference, then a fault condition is detected. For example if the first yaw moment at the point of slippage is higher than the expected sliding level then the yaw system has a "stuck" fault condition, and if the first yaw moment at the point of slippage is lower than the expected sliding level then the yaw system has a "loose" fault condition. Such a determination is indicative of a fault in the yaw system and further investigation and action will be required. For instance the wind turbine might be de-rated or stopped, or the fault may be communicated to a human operator via a display for example. Alternatively, the yaw testing procedure could be executed just before the turbine starts up. In this scenario, if a fault is detected, the rotor(s) coupled to the faulty yaw system will not be allowed to start up.

In the example above describing testing of the first sub-system 204a, a fault may lie in the first sub-system 204a, or it may lie in the yaw gear 202.

A fault condition may arise due to: the yaw system being locked manually for service purposes and unlocking having been forgotten; ambient conditions such as special temperature conditions which affects the friction properties of the yaw bearing; a fault in a drive system of the yaw system, e.g. a pressure valve defect in the hydraulic circuit; or if a controller has not released a yaw brake acting on the yaw gear due to a software fault.

Only the first sub-system may be tested as described above, but more typically after the first sub-system has been tested, the second sub-system is tested in a similar manner: by applying a second yaw moment to the yaw gear 202 with the first drive motor 208a via the first pinion gear 206a, reacting the second yaw moment with the second pinion gear 206b, monitoring a yaw motion parameter indicative of rotation of the yaw gear 202, and determining a condition of the second sub-system 204b based on the monitored yaw motion parameter. For instance the condition may be based on the magnitude of the second yaw moment being applied when the monitored yaw motion parameter indicates that the yaw gear is rotating.

Figure 3:
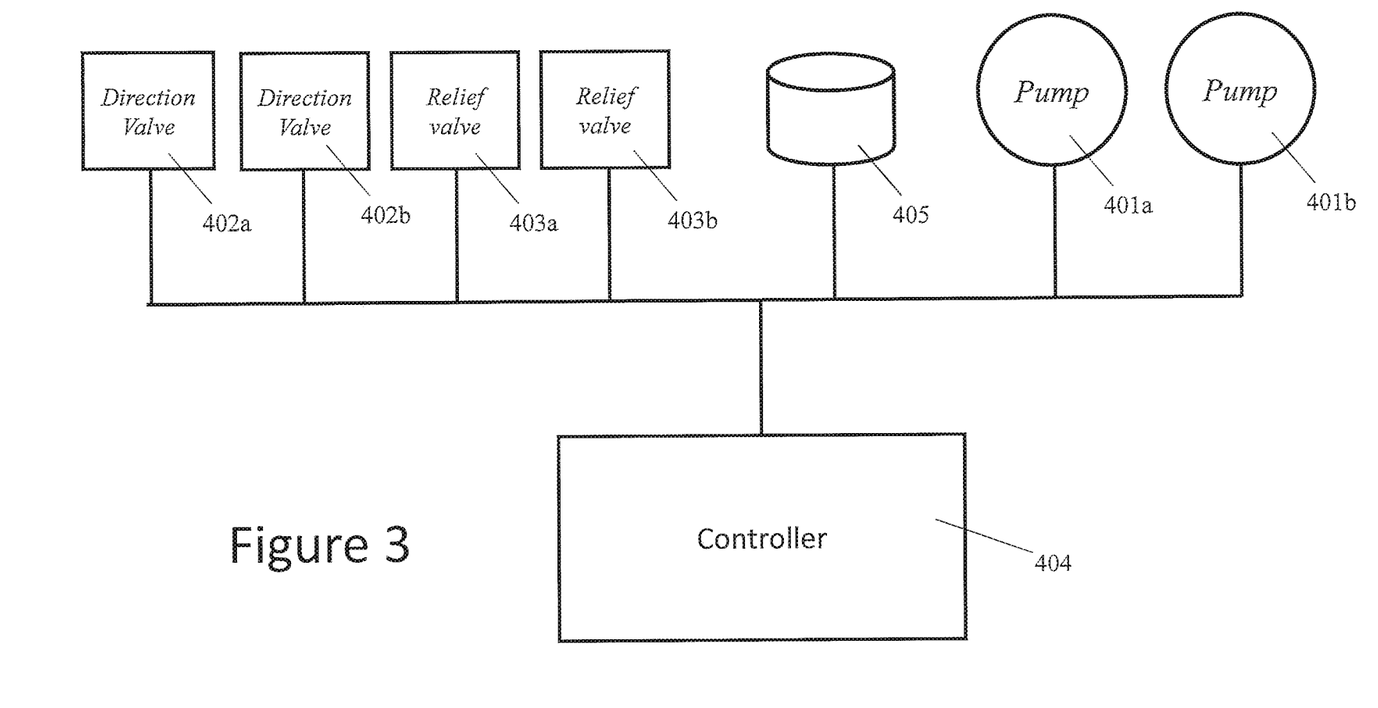
FIG. 3 shows a controller connected to the hydraulic circuits.

FIG. 3 illustrates a test system for testing the yaw system described above. The test system comprises a controller 404 electrically connected to each of the valves 402a,b, 403a,b and each of the pumps 401a,b.

The controller 404 is a computer system operable to control the valves and pumps to perform the testing procedures described above. More specifically: a memory 405 contains a computer program product directly loadable into the memory 405 and accessible by the controller 404, the computer program product comprising instructions for performing the test procedures described above when the computer program product is run on the controller 404.

The test procedures described above may be performed during normal operation of the wind turbine, when it is generating electrical power. However more typically the test procedures described above are not intended to be performed during normal operation of the wind turbine. In other words the wind turbine is not generating electrical power as the test procedures are performed, and the rotors are either parked or idling so that little or no thrust is being generated by the rotors. In fact the testing procedures may even be applied to the yaw control system before it is installed onto the tower along with the rotors.

The controller 404 is also operable during normal operation (i.e. when the wind turbine is generating power) to control the valves and pumps so that the first and second sub-systems 204a, b are driven together to rotate the rotors to a desired yaw angle—in other words to provide active yawing. Thus during normal operation the yaw position of the rotors is controlled by simultaneously applying yaw control moments to the yaw gear 202 with the first and second drive motors via the first and second pinion gears respectively so that rotation of the yaw gear causes yaw rotation of the rotors to a desired yaw angle.

In the embodiment of FIG. 3, each relief valve has a threshold which can be adjusted remotely via a control signal from the controller 404.

During the test procedures described above, the threshold of the relief valve (and the associated expected sliding level) for the sub-system under test may be set by the controller 404 to a normal level, or to a reduced level which is less than the normal level.

During the test procedures described above, the threshold of the relief valve for the sub-system applying the yaw moment may be set by the controller 404 to the normal level.

During the active yawing described above the threshold of both of the relief valves may be set by the controller to the normal level.

In an alternative embodiment the relief valves may have only manual adjustment. In this case the threshold of both of the relief valves would be set only for the normal sliding level.

Figure 4:
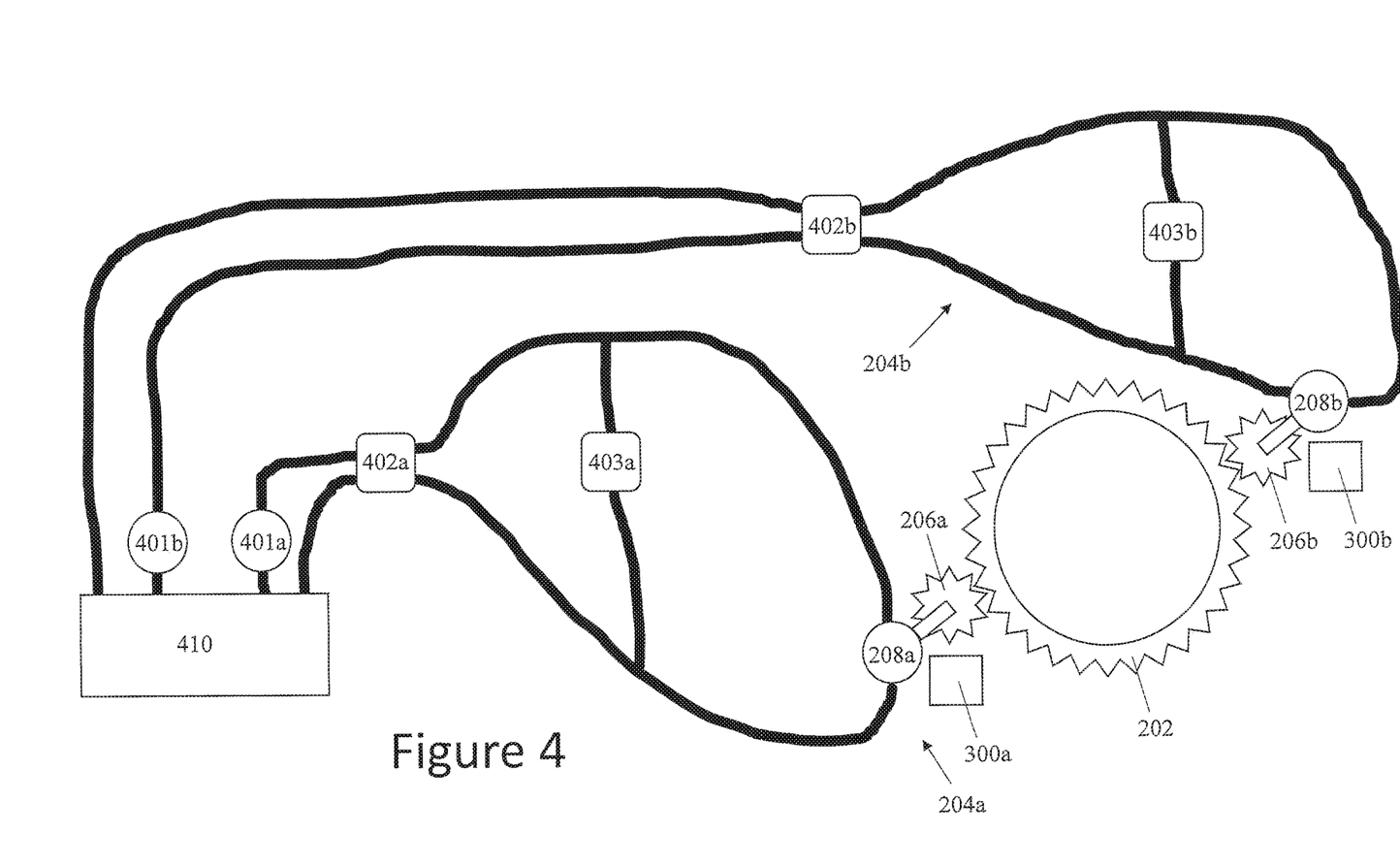
FIG. 4 shows the yaw system of FIG. 2 with frictional yaw brakes.

FIG. 4 illustrates a system similar to that shown in FIG. 2, the same reference numbers being used to indicate equivalent components. The system of FIG. 4 differs from that of FIG. 2 in that the first sub-system comprises a first frictional yaw brake 300a which acts on the first pinion gear 206a, or any other part of the drive train coupling the first motor 208a to the yaw gear 202. Similarly, the second sub-system comprises a second frictional yaw brake 300b with an equivalent function. The yaw brakes 300a,b are operated to hold the first and second sub-systems respectively to either replace the hold functions of the hydraulic circuits, or supplement them. In this case the testing of the first and second sub-systems can be used to test the hold function of the yaw brakes 300a, b.

FIG. 4 shows yaw brakes which act on the individual sub-systems, but optionally the yaw control system may have a further yaw brake which acts on the yaw gear 202 rather than one of the sub-systems. In this case the testing of the first or second sub-system also checks whether the further yaw brake has not been released due to a software fault.

FIGS. 2-4 show a yaw control system with hydraulic drive motors, but in an alternative embodiment the yaw control system may be an electrical yaw control system which uses electric drive motors. In this case each sub-system has an electric motor which drives an input shaft on a high-speed side of a gearbox, and an output shaft on a low-speed side of the gearbox drives the pinion gear. In the hydraulic embodiments of FIGS. 2-4, the drive train coupling the hydraulic motor to the yaw gear consists only of the pinion gear, but where a gearbox is provided then the drive train comprises not only the pinion gear but also the gearbox. A frictional yaw brake acts on the electric drive motor, or part of the drive train, to provide the necessary hold function for each sub-system. In this case the testing of the first and second sub-systems checks the operation of the frictional yaw brakes and their associated motors and drive trains.

In another embodiment (not illustrated) the electrical yaw control system may use an active control method in which the electrical motors are energised to generate the yaw counter-moment and provide the hold function, rather than using frictional brakes or a hydraulic circuit. Each electric motor has an encoder which outputs the motor position. A closed-loop control system operates the electric motor as required to maintain the motor position at a set-point associated with a desired yaw angle. Thus the electric motors continuously apply a counter-torque in one or other direction to hold the rotors at the desired yaw angle determined by the set-point. The closed-loop control system is programmed with a saturation on the torque which limits the counter-torque which can be applied by the electric motors. When the closed-loop control system is requested to apply a counter-torque above this threshold (for instance due to a large gust during normal operation, or when the magnitude of the applied yaw moment increases during the testing procedure described above) then the requested counter-torque will not be applied so the electric motor will be back-driven by the yaw moment applied by the other electric motor. This back-driving is analogous to the sliding or slippage described above, and allows the yaw angle to change and prevent excessive torque loads being transmitted to the tower. The back-driving function is tested by performing the test procedures described above.

In the embodiments described above, the yaw control system has only two sub-systems. In other embodiments there may be three or more sub-systems which may be tested in a number of different ways. For example, each sub-system could be tested by simultaneously applying yaw moments to the yaw gear with some or all of the other sub-systems and reacting the applied yaw moment(s) with the sub-system being tested. Alternatively each sub-system could be tested by applying a yaw moment to the yaw gear with only one of the other sub-systems, the remaining sub-systems being "loose" during the testing process—i.e. not applying torque to the yaw gear or reacting torque from the yaw gear.

Figure 5:
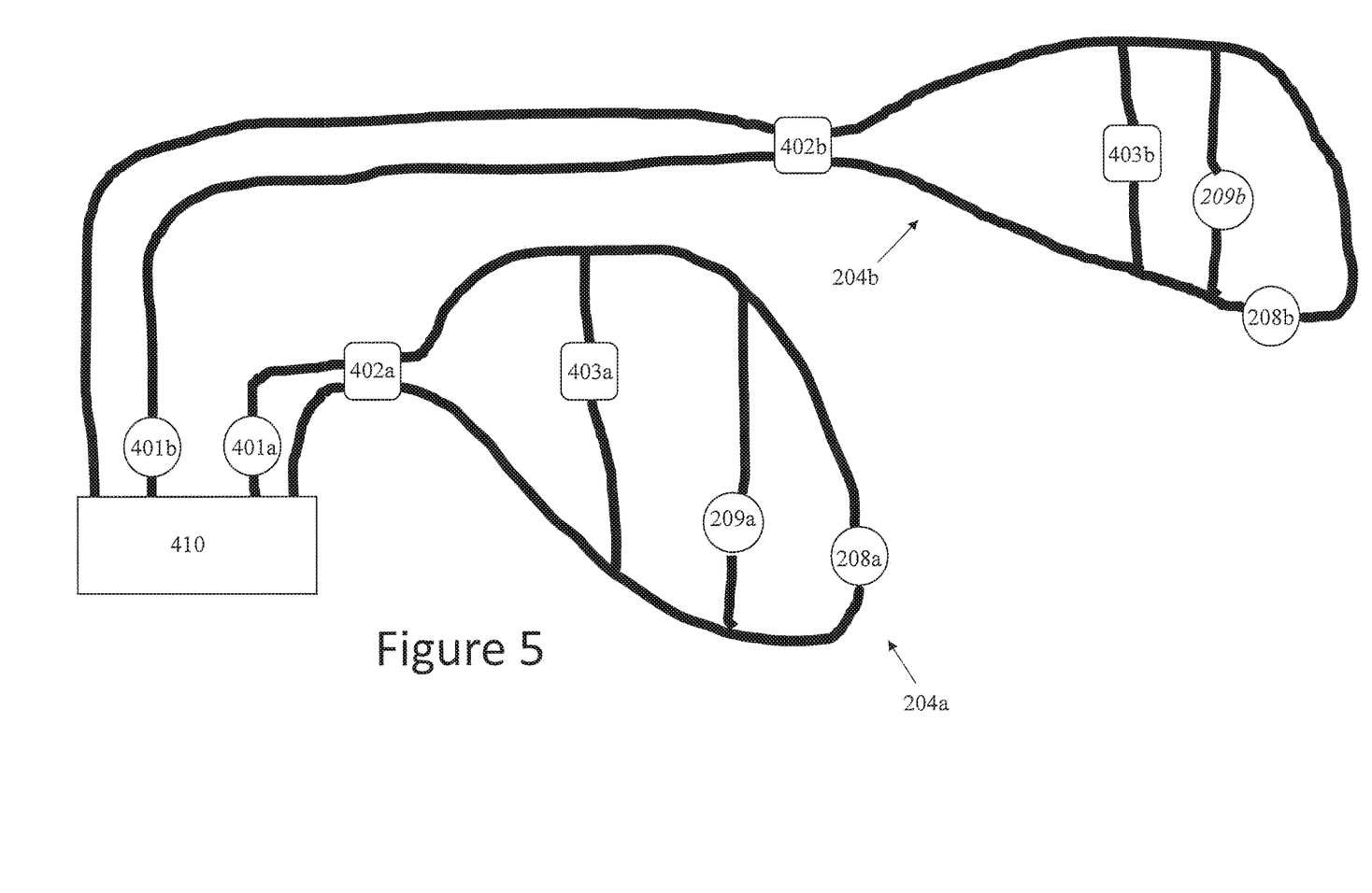
FIG. 5 shows a yaw system with multiple drive motors per sub-system.

In FIGS. 2-4, each sub-system has only a single hydraulic drive motor and a single pinion gear, but in an alternative embodiment shown in FIG. 5, each sub-system has multiple hydraulic drive motors 208a,209a; 208b,209b; each having an associated pinion gear (not shown). In this case there are two drive motors per sub-system but the principle may be extended to provide any number, for instance sixteen drive motors per sub-system. The drive motors of each sub-system are connected in parallel to their hydraulic circuit so that they can be driven together to simultaneously apply yaw moments to the yaw gear, or locked by their direction valve to simultaneously react yaw moments applied by the other sub-system.

Each sub-system is tested by operating all of the motors of the other sub-system to apply yaw moments which are reacted by the sub-system under test. So in this case the testing method does not identify a fault in an individual motor or pinion gear, but only identifies that a fault is present in some part of the sub-system under test: for instance in a motor or a pinion gear, or in the relief valve of the hydraulic system.

Although the invention has been described above with reference to one or more preferred embodiments, it will be appreciated that various changes or modifications may be made without departing from the scope of the invention as defined in the appended claims.

The invention claimed is:

1. A method of testing a yaw system of a wind turbine, the wind turbine comprising a rotor; the yaw system comprising a yaw gear coupled to the rotor so that rotation of the yaw gear causes yaw rotation of the rotor, and first and second sub-systems, the first sub-system comprising a first pinion gear and a first drive motor coupled to the yaw gear by the first pinion gear, the second sub-system comprising a second pinion gear and a second drive motor coupled to the yaw gear by the second pinion gear, the method comprising: testing the first sub-system by: applying a first yaw moment to the yaw gear with the second drive motor via the second pinion gear, reacting the first yaw moment with the first pinion gear, monitoring a yaw motion parameter indicative of rotation of the yaw gear, and determining a condition of the first sub-system based on the monitored yaw motion parameter.

2. The method of claim 1, further comprising: testing the second sub-system by: applying a second yaw moment to the yaw gear with the first drive motor via the first pinion gear, reacting the second yaw moment with the second pinion gear, monitoring a yaw motion parameter indicative of rotation of the yaw gear, and determining a condition of the second sub-system based on the monitored yaw motion parameter.

3. The method of claim 1, wherein during the test of the first sub-system the first sub-system is held by a first brake or a first hydraulic circuit, and/or during the test of the second sub-system the second sub-system is held by a second brake or a second hydraulic circuit.

4. The method of claim 3, wherein during the test of the first sub-system the first drive motor or the first pinion gear is held by a first brake or a first hydraulic circuit, and/or during the test of the second sub-system the second drive motor or the second pinion gear is held by a second brake or a second hydraulic circuit.

5. The method of claim 1, wherein during the test of the first sub-system the first drive motor is energised to generate a first yaw counter-moment which reacts the first yaw moment via the first pinion gear; and/or during the test of the second sub-system the second drive motor is energised to generate a second yaw counter-moment which reacts the second yaw moment via the second pinion gear.

6. The method of claim 1, wherein a magnitude of the first yaw moment increases during the testing of the first sub-system and/or a magnitude of the second yaw moment increases during the testing of the second sub-system.

7. The method of claim 1, wherein determining a condition of the first sub-system based on the monitored yaw motion parameter comprises determining a yaw moment parameter indicative of a magnitude of the first yaw moment at a point when the monitored yaw motion parameter indicates that the yaw gear has rotated; and/or determining a condition of the second sub-system based on the monitored yaw motion parameter comprises determining a yaw moment parameter indicative of a magnitude of the second yaw moment at a point when the monitored yaw motion parameter indicates that the yaw gear has rotated.

8. The method of claim 7, wherein the yaw moment parameter is compared to an expected level in order to identify a fault condition.

9. The method of claim 1, wherein each of the first and second sub-systems has a plurality of motors and a plurality of pinion gears, each motor of the plurality of motors is coupled to the yaw gear via a respective pinion gear, during the test of the first sub-system yaw moments are simultaneously applied to the yaw gear by each of the motors of the second sub-system via their respective pinion gears and reacted by each of the pinion gears of the first sub-system, and/or during the test of the second sub-system yaw moments are simultaneously applied to the yaw gear by each of the motors of the first sub-system via their respective pinion gears and reacted by each of the pinion gears of the second sub-system.

10. The method of claim 1, wherein the wind turbine comprises at least two rotors, wherein the yaw gear is coupled to the rotors so that rotation of the yaw gear causes yaw rotation of the rotors.

11. The method of claim 1, wherein the wind turbine comprises a tower with a support structure, the rotor is mounted to the support structure, and rotation of the yaw gear causes yaw rotation of the support structure about a longitudinal axis of the tower.

12. A method of testing and controlling a wind turbine, the method comprising:

testing a yaw system of the wind turbine by performing the testing method of claim 1, and after testing the yaw system, controlling a yaw position of the rotor by simultaneously applying yaw control moments to the yaw gear with the first and second drive motors via the first and second pinion gears respectively so that rotation of the yaw gear causes yaw rotation of the rotor.

13. A method of testing and controlling a wind turbine, the method comprising:

testing a yaw system of the wind turbine by performing the testing method of claim 1; and if a fault condition is determined by the testing method, derating the wind turbine, performing a controlled shutdown of the wind turbine or preventing the wind turbine from starting up.

14. A test system for testing a yaw system of a wind turbine, the wind turbine comprising a rotor, the yaw system comprising a yaw gear coupled to the rotor so that rotation of the yaw gear causes yaw rotation of the rotor, and first and second sub-systems, the first sub-system comprising a first pinion gear and a first drive motor coupled to the yaw gear by the first pinion gear, the second sub-system comprising a second pinion gear and a second drive motor coupled to the yaw gear by the second pinion gear, the test system comprising:

a controller including a memory storing instructions that, when executed by the controller, cause the test system to test the first sub-system by applying a first yaw moment to the yaw gear with the second drive motor via the second pinion gear, reacting the first yaw moment with the first pinion gear, monitoring a yaw motion parameter indicative of rotation of the yaw gear, and determining a condition of the first sub-system based on the monitored yaw motion parameter.

15. A wind turbine comprising:

a rotor;

a yaw system comprising a yaw gear coupled to the rotor so that rotation of the yaw gear causes yaw rotation of the rotor, first and second sub-systems, the first sub-system comprising a first pinion gear and a first drive motor coupled to the yaw gear by the first pinion gear, the second sub-system comprising a second pinion gear and a second drive motor coupled to the yaw gear by the second pinion gear; and a test system comprising a controller including a memory storing instructions that, when executed by the controller, cause the test system to test the first sub-system by applying a first yaw moment to the yaw gear with the second drive motor via the second pinion gear, reacting the first yaw moment with the first pinion gear, monitoring a yaw motion parameter indicative of rotation of the yaw gear, and determining a condition of the first sub-system based on the monitored yaw motion parameter.

16. The wind turbine according to claim 15, wherein the yaw system further comprises a first brake or a first hydraulic circuit arranged to hold the first motor or the first pinion gear; and a second brake or a second hydraulic circuit arranged to hold the second motor or the second pinion gear.

17. The wind turbine according to claim 15, wherein the wind turbine comprises at least two rotors, wherein the yaw gear is coupled to the rotors so that rotation of the yaw gear causes yaw rotation of the rotors.

18. A computer program product for testing a yaw system of a wind turbine, the wind turbine comprising a rotor, the yaw system comprising a yaw gear coupled to the rotor so that rotation of the yaw gear causes yaw rotation of the rotor, and first and second sub-systems, the first sub-system comprising a first pinion gear and a first drive motor coupled to the yaw gear by the first pinion gear, the second sub-system comprising a second pinion gear and a second drive motor coupled to the yaw gear by the second pinion gear, the computer program product comprising:

a non-transitory computer-readable storage medium; and
program code stored on the non-transitory computer-readable storage medium that, when executed by one or more processors, causes the one or more processors to:
test the first sub-system by applying a first yaw moment to the yaw gear with the second drive motor via the second pinion gear, reacting the first yaw moment with the first pinion gear, monitoring a yaw motion parameter indicative of rotation of the yaw gear, and determining a condition of the first sub-system based on the monitored yaw motion parameter perform.

* * * * *